(12) United States Patent
Takayama et al.

(10) Patent No.: US 6,595,893 B1
(45) Date of Patent: Jul. 22, 2003

(54) FREEING MECHANISM FOR MOTORIZED GEAR REDUCER

(75) Inventors: Sukeo Takayama, Gifu (JP); Michiaki Yatabe, Gifu (JP); Shigeru Takai, Gifu (JP)

(73) Assignee: Teijin Seiki Co., Ltd., Minato-ku (JP)

( * ) Notice: Subject to any disclaimer, the term of this patent is extended or adjusted under 35 U.S.C. 154(b) by 0 days.

(21) Appl. No.: 09/521,992

(22) Filed: Mar. 9, 2000

(30) Foreign Application Priority Data

Mar. 26, 1999 (JP) .......................................... 11-084201
Sep. 1, 1999 (JP) .......................................... 11-247015

(51) Int. Cl.[7] .............................. F16H 3/44; F16C 3/03; F16D 3/06
(52) U.S. Cl. ........................ 475/298; 475/300; 464/154; 464/157; 464/162; 403/359.6; 192/69.91
(58) Field of Search ................................ 475/298, 300; 464/153, 154, 155, 156, 157, 158, 159, 162, 169; 403/359.6, 359.1, 298; 192/69.91, 34

(56) References Cited

U.S. PATENT DOCUMENTS

| | | | |
|---|---|---|---|
| 3,126,722 A | * 3/1964 | Kramer et al. | .......... 464/159 X |
| 3,184,985 A | 5/1965 | Dreitzler | |
| 3,290,918 A | * 12/1966 | Weasler | ............... 403/359.6 X |
| 4,043,226 A | 8/1977 | Buuck | |
| 4,086,991 A | * 5/1978 | Swadley | ................... 192/69.91 |
| 4,115,022 A | * 9/1978 | Orain | ...................... 403/359.6 |
| 4,195,718 A | * 4/1980 | Schmohe | ................. 464/162 X |
| 4,334,590 A | * 6/1982 | Plumb | ..................... 475/300 X |
| 4,344,305 A | * 8/1982 | Holmes | ...................... 464/169 |
| 4,348,918 A | 9/1982 | Fukui | |
| 4,407,170 A | 10/1983 | Fukui | |
| 4,437,782 A | * 3/1984 | Geisthoff | ............. 403/359.6 X |
| 4,611,506 A | 9/1986 | Groothius | |
| 4,662,246 A | * 5/1987 | Cheek et al. | ................ 475/331 |
| 4,667,366 A | * 5/1987 | Melara | ........................ 16/31 R |
| 5,080,634 A | * 1/1992 | Makase | ....................... 464/169 |
| 5,098,343 A | * 3/1992 | Tysver et al. | ................ 464/169 |
| 5,116,291 A | * 5/1992 | Toyosumi et al. | ........ 192/69.91 |
| 5,149,223 A | * 9/1992 | Watts | .................. 403/359.6 X |
| 5,199,325 A | * 4/1993 | Reuter et al. | ........... 464/169 X |
| 5,199,738 A | * 4/1993 | VanDenberg | ............. 192/69.91 |
| 5,267,915 A | * 12/1993 | Estabrook | ................. 192/69.91 |
| 5,289,730 A | * 3/1994 | Wilson et al. | ........... 192/69.91 |
| 5,503,494 A | * 4/1996 | Kamata et al. | .......... 403/359.6 |
| 5,697,850 A | * 12/1997 | Yaegashi et al. | ............. 464/162 |
| 5,782,593 A | * 7/1998 | Klement | ................. 475/298 X |
| 5,899,307 A | * 5/1999 | Zaun et al. | ............... 192/69.91 |
| 6,058,791 A | * 5/2000 | Brunet | .................... 464/169 X |

FOREIGN PATENT DOCUMENTS

| | | |
|---|---|---|
| EP | 57 163752 | 8/1982 |
| FR | 1369490 | 7/1964 |
| JP | 64-5176 | 1/1989 |

* cited by examiner

Primary Examiner—Charles A. Marmor
Assistant Examiner—Ha Ho
(74) Attorney, Agent, or Firm—Akin Gump Strauss Hauer & Feld, L.L.P.

(57) ABSTRACT

A motorized gear reducer wherein a first external gear 41 is mounted on an input rotary shaft 11 coupled to a driving motor 3 and wherein a second external gear 43 is capable of engaging with the first external gear. The front end portion 63 of the first external gear side of the input rotary shaft is unable to make a relative rotation with respect to the input rotary shaft but made movable in the axial direction of the input rotary shaft. The front end portion thereof movably axially engages with the first external gear. The front end portion and the first external gear are allowed to select one of the conditions including making an integral rotation and freely making relative rotations in accordance with the axial movement of the front end portion.

18 Claims, 3 Drawing Sheets

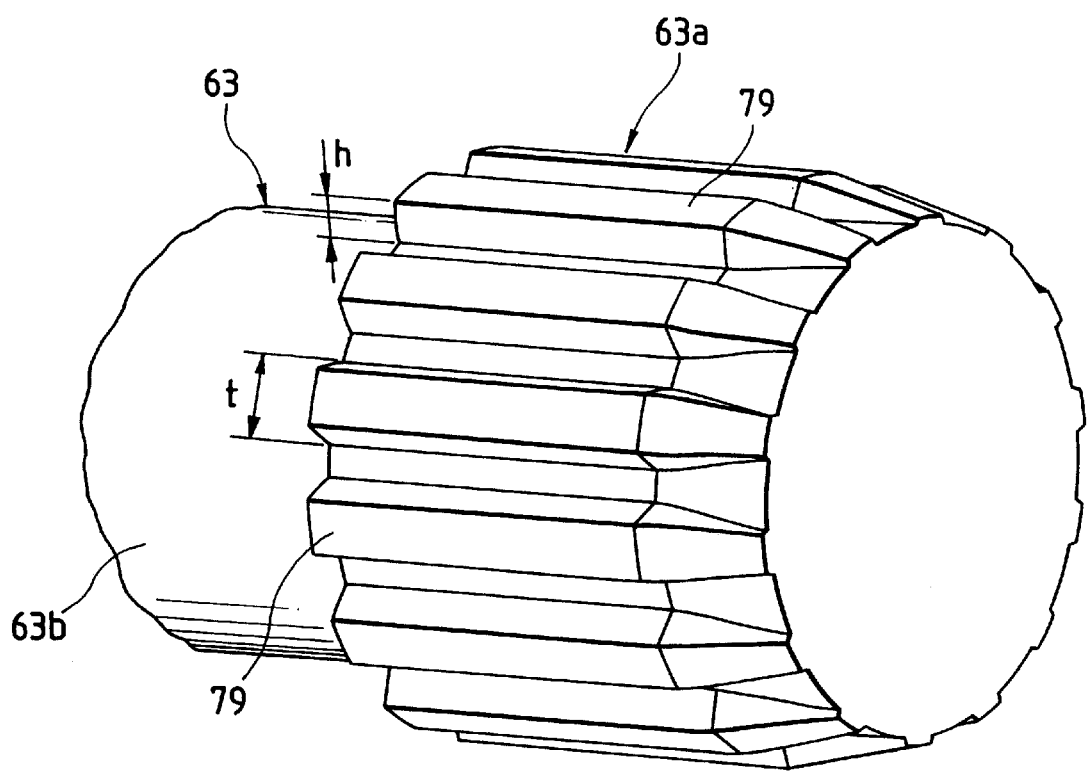

FREEING MECHANISM FOR MOTORIZED GEAR REDUCER

BACKGROUND OF THE INVENTION

This invention relates to gear reducers and more particularly to a freeing mechanism for a motorized gear reducer.

Motorized gear reducers incorporating motors are widely used now. JP-B-64-5176, for example, discloses a reducer for reducing the rotation caused by a hydraulic motor via a planetary differential gear reducer in order to take out the output. According to this JP-B-64-5176, the output thus taken out is used to drive a crawler vehicle, for example.

When the motor in such a conventional motorized gear reducer as mentioned above malfunctions for some reason or other, the output portion of the gear reducer becomes unable to be moved because the motor and the gear reducer are integrally coupled together. Particularly when the motorized gear reducer like this is used in a vehicle traveling apparatus, any attempt to have the vehicle repaired by coupling the vehicle to a towing vehicle and sending it to a predetermined repair shop will result in necessitating an extremely large power for towing the vehicle as the motor is unseparable from the gear reducer and the problem is that the vehicle in need of repair becomes practically untransportable.

SUMMARY OF THE INVENTION

In view of the foregoing problems, an object of the present invention is to provide a motorized gear reducer so adapted that when it is needed to operate the motorized gear reducer freely for some reason or other, the whole of the motorized gear reducer can easily be operated by releasing the gear reducer from being coupled to the motor and applying small force to the output side of the gear reducer.

To achieve the above-noted object, the present invention provides a freeing mechanism for a motorized gear reducer comprising: a driving motor; an input rotary shaft coupled to the driving motor; first and second external gears meshing with each other; and a movable shaft member selectively coupling the first external gear to the input rotary shaft.

The movable shaft member is axially movable between first and second positions relative to the input rotary shaft and the first external gear so that the movable shaft in the first position is engaged with both the input shaft and the first external gear to establish an integral rotation condition, and the movable shaft in the second position is engaged with one of the input rotary shaft and the first external gear but disengaged from the other of the input rotary shaft and the first external gear to establish a free rotation condition.

In a preferred embodiment, a motorized gear reducer is constructed such that a first external gear is mounted on an input rotary shaft coupled to a driving motor and a second external gear is capable of engaging with the first external gear. The front end portion of the first external gear side of the input rotary shaft is unable to make a relative rotation with respect to the input rotary shaft but made movable in the axial direction of the input rotary shaft. The front end portion thereof movably axially engages with the first external gear. The front end portion thereof and the first external gear are allowed to select one of the conditions including making an integral rotation and freely making relative rotations in accordance with the axial movement of the front end portion thereof.

In this arrangement, the front end portion of the input rotary shaft coupled to the driving motor is made movable in the axial direction of the input rotary shaft, and the front end portion thereof and the first external gear are allowed to select one of the conditions including making the integral rotation and freely making relative rotations in accordance with the axial movement of the front end portion thereof. Consequently, when it is needed to free the motorized gear reducer for some reason or other, the coupling of the driving motor to the reducer is released by setting free the front end portion of the input rotary shaft from the first external gear, so that the reducer can be operated by applying small force to the output side of the gear reducer.

Although the invention can be implement in gear reducers in general, it is also applicable to a planetary differential gear reducer having a reduction gear in the preceding stage as disclosed in JP-B-64-5176. In this case, the second external gear is preferably coupled to the crank pin of the planetary differential gear reducer.

According to the specific embodiment of the invention, the motorized gear reducer is such that the front end portion of an input rotary shaft on the first external gear side includes a cylindrical member which is integrally mounted to the front end portion of the body of the input rotary shaft and has a spline groove at the front end of the first external gear side, and a shaft member which is axially movably joined to the cylindrical member by way of a spline joint; the shaft member axially has a shaft-side spline having a predetermined length at the front end on the first external gear side; the base side of the first external gear is cylindrical; and in the hollow portion of the first external gear, there are formed a cylinder-side spline engaging with the shaft-side spline formed for the shaft member by way of spline engagement, and a large-diameter hole portion 41b not engaging with the shaft-side spline by way of spline engagement.

The front end portion of the input rotary shaft is thus formed with the cylindrical member having the spline groove and the shaft member joined to the spline groove so as to hold the cylindrical member in such a state that the coupling of the cylindrical member to the shaft member may be maintained. With the formation of the shaft-side spline having the predetermined length in the front end portion of the cylindrical member, the shaft-side spline is allowed to select one of the conditions including making the cylindrical portion on the base side of the first external gear engage with the cylinder-side spline and disengage therefrom, whereby the input rotary shaft and the first input rotary shaft are allowed to select one of conditions wherein both are engaging with each other and set free from engaging with each other.

In this case, the front end portion on the input rotary shaft side preferably has a spring member for engaging the shaft-side spline with the cylinder-side spline by way of spline engagement by normally urging the shaft member toward the first external gear side. Thus, the shaft member is normally kept engaging with the first external gear.

In order that the shaft member and the first external gear are allowed to select one of the engagement and free conditions, the reducer includes a cover member located outside the first input rotary shaft, a pin member engaging with the axial front end of the shaft member of the input rotary shaft and a recessed member engaging with the outer-side front end of the pin member. Further, the shaft-side spline and the cylinder-side spline are preferably allowed to select one of the spline engagement and free conditions depending on the direction of mounting the recessed member.

The shaft-side spline is joined to the cylinder-side spline when the recessed member in the outwardly recessed condition is mounted, whereas the shaft member is forced inside when the recessed member in the inwardly recessed condition is mounted, in accordance with the direction of mounting the recessed member. The shaft-side spline and the cylinder-side spline are reduced to the free condition, whereby their joined and freed conditions can be attained quite simply. In order to simplify the movement of the shaft member in particular, the recessed member is joined to the cover member with a bolt, whereby detachably providing the recessed member results in simplifying the movement of the shaft member without using special tools.

In order to allow the relative rotation of the shaft member with respect to the pin member for pressing the shaft member in this case, a small-diameter ball is preferably provided in the front end portion of the shaft member so as to allow the input rotary shaft together with shaft member to rotate.

It is also preferable that internal teeth of a spline formed on the first external gear and external teeth of a spline formed on the front end portion of the input rotary shaft on the first external gear side are used to disengageably couple the input rotary shaft to the first external gear, and tooth thickness of at least one of the internal and external teeth is gradually decreased at and near axial ends of the internal and external teeth where they are initially engaged when said front end portion is axially moved. This preferable arrangement makes it possible to carry out the engagement between the external and internal teeth of the spline smoothly.

Similarly, it is also preferable that internal teeth of a spline formed on the first external gear and external teeth of a spline formed on the front end portion of the input rotary shaft on the first external gear side are used to disengageably couple the input rotary shaft to the first external gear, and tooth height of at least one of the internal and external teeth is gradually decreased at and near axial ends of the internal and external teeth where they are initially engaged when said front end portion is axially moved. This preferable arrangement makes it possible to carry out the engagement between the external and internal teeth of the spline smoothly.

The present disclosure relates to the subject matter contained in Japanese patent applications Nos. Hei. 11-84201 (filed on Mar. 26, 1999), and Hei. 11-247015 (filed on Sept. 1, 1999), which are expressly incorporated herein by reference in their entireties.

BRIEF DESCRIPTION OF THE DRAWINGS

FIG. 3 is an enlarged view showing a part of a shaft member.

DESCRIPTION OF THE PREFERRED EMBODIMENT

Figure 1:
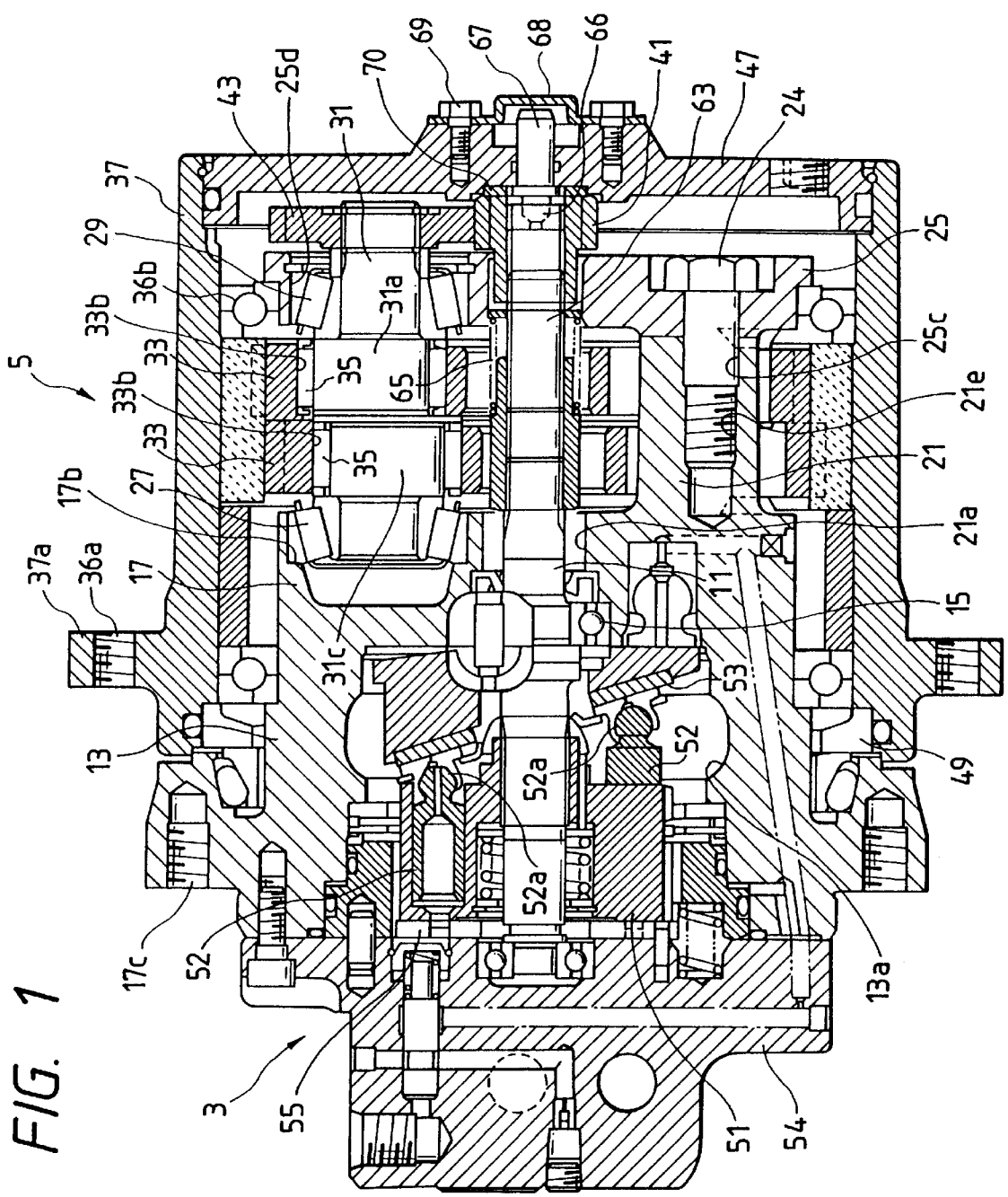
FIG. 1 is a sectional view of a motorized gear reducer embodying the invention, wherein the reducer coupled to the hydraulic motor has a two-stage reduction mechanism including a first-stage gear reduction mechanism and a second-stage planetary differential gear reducer.

An embodiment of the present invention will now be described in detail by reference to the accompanying drawings. FIG. 1 is a sectional view of a motorized gear reducer embodying the invention, wherein a driving motor is a hydraulic motor and the reducer coupled to the hydraulic motor has a two-stage reduction mechanism including a first-stage gear reduction mechanism and a second-stage planetary differential gear reducer. FIG. 2 is an enlarged view of a portion of FIG. 1 where the right end portion of an input rotary shaft is coupled to a first external gear: (a) refers to a state in which the input rotary shaft and the first external gear have been coupled together; and (b) to a free state in which the input rotary shaft has been released from being coupled to the first external gear.

The embodiment shown in FIG. 1 represents a case where the invention is applied to a reducer with a hydraulic motor for driving a vehicle with travel wheels. A hydraulic motor 3 of the type described later is mounted in the frame (not shown) of the vehicle, so that a sprocket (not shown) of travel driving system is driven with large output torque via the collar 37a of a hub 37 by means of a reducer 5 for reducing the revolutions of the hydraulic motor 3. In this case, the output shaft 11 of the hydraulic motor 3 is the input rotary shaft of the reducer 5 according to the invention and rotatably supported by a bearing 15 in the casing 13 of the hydraulic motor 3. The casing 13 of the hydraulic motor 3 forms a support block of the reducer 5 according to the invention and the casing will be called the support block 13.

First, the structure of the plane differential gear reducer will be described. The body of the support block 13 includes a disk-like portion 17 forming the body of the hydraulic motor 3 and a pillar-like portion 21 projecting from the disk-like portion 17.

In the surface of the disk-like portion 17, there are formed a bearing fitting hole 17b having a predetermined depth with respect to the adjoining pillar-like portion 21, and a threaded hole 17c for use in joining the support block 13 to the vehicle frame with a bolt. Further, a central hole 21a for use in fitting the input rotary shaft 11 therein is bored in the central portion of the pillar-like portion 21. As shown on the left-hand side of FIG. 1, an end disk 25 forming part of the support block 13 is integrally joined to the pillar-like portion 21 of the support block 13 with a pin (not shown) and fixed to the pillar-like portion 21 of the support block 13 with a bolt 24. A threaded hole 21e is used as a clamping hole of the bolt 24 and formed in the pillar-like portion 21.

A pin hole (not shown) corresponding to the pin hole of the pillar-like portion 21 is bored in the end disk 25, and a bearing fitting hole 25d corresponding to the bearing fitting hole 17b is formed in the disk-like portion 17. Roller bearings 27 and 29 are fitted into the respective bearing fitting holes 17b and 25d, and both ends of a crank pin 31 for securing the rotating motion of a pinion 33 are supported by the bearings 27 and 29. The crank pin 31 has two crank portions 31a and 31c eccentrically positioned relative to the rotary longitudinal axis of the crank pin 31, and the pinion 33 is fitted into the crank portions 31.a and 31c.

The pinion 33 has an external tooth having a tooth shape forming an equidistant curve toward a cycloid curve on the outer peripheral face and also provided with a pin hole 33b mating with the crank portion 31a or 31c of the crank pin 31 via a bearing 35. Moreover, there is formed a groove (not shown) that is used for the pillar-like portion, extended radially from the central portion of the pinion 33, formed in the support block 13 and slightly dimensionally greater than the pillar-like portion 31.

According to this embodiment of the invention, ball bearings 36a and 36b are fitted to the disk-like portion 17 of the support block 13 and the outer peripheral portion of the end disk 25 whereby to rotatably support the hub 37. The hub 37 is used to drive the driving sprocket of the vehicle and has on its inner peripheral face internal teeth having a slightly greater number of teeth than the external teeth formed on the outer periphery of the pinion 33. The groove for the pillar-like portion of the pinion 33 is idly fitted into the pillar-like portion 21 of the support block 13. Two of the pinions 33 make an eccentric revolving motion when the central longitudinal axes of the crank portions 31a and 31c make a revolving motion relative to the rotating longitudinal axis of the crank pin 31 because of the rotating motion of the crank pin 31, so that the external teeth of the pinion 33 engage with the internal gear of the hub 37.

According to this embodiment of the invention, a first external gear 41 is fastened to the right-hand front end of the input rotary shaft 11 as will be described below and a second external gear 43 having a greater number of teeth than the first external gear 41 is fastened to the right end of the crank pin 31 with its both ends supported as described above so as to make both the gears 41 and 43 mesh with each other. A cover member 47 is airtightly attached to the outer sides of both the gears 41 and 43. Further, an oil seal 49 is provided on the outer side of the bearing 36a that rotatably supports the hub 37 to prevent lubricating oil from leaking out of the reducer 5.

The rotation of the output shaft of the hydraulic motor 3, that is, of the input rotary shaft 11 of the reducer is reduced (first-stage reduction) at the number of teeth ratio of the gears 41 to 43 before being transferred to the second external gear 43 engaging with and via the first external gear 41 fastened to the input rotary shaft 11. The rotation of the second external gear 43 causes the crank portion 31a of the crank pin 31 with its both ends rotatably supported by the support block 13 to make the revolving motion, which also causes the pinion 33 to make the eccentric revolving motion as the pin hole 33b of the pinion 33 is mating with the crank portion 31a via the bearing 35. Then the plurality of crank pins 31 function as those having only the rotating motion component taken to the hub 37 out of the revolving and rotating motion components of the pinion 33. Therefore, the eccentric revolving motion of the pinion 33 makes the external teeth 33a formed on the outer periphery of the pinion 33 engage with the internal gear formed on the inner periphery of the hub 37, thus letting the hub 37 make a reduced rotation (second-stage reduction). Thus, the travel system of the vehicle is driven by the sprocket fitted to the collar 37a of the hub 37.

The structure of the hydraulic motor 3 will now be described. The support block 13 of the above-mentioned reducer simultaneously forms the body of the motor 3. A cylindrical internal hole 13a is formed in the motor body 13, and the input rotary shaft 11 of the reducer is passed through the internal hole 13a and rotatably supported by the motor body 13. A cylinder block 51 is coupled by a spline to the input rotary shaft 11, and a plurality of pistons 52 are axially and slidably mounted in the cylinder block 51. An inclined plate 53 is fitted in the internal hole 13a of the body. The front end of the piston 52 abuts against the inclined plate 53 via a shoe 52a.

A valve plate 55 is provided between the left edge face of the cylinder block 51 and a cover body 54 for closing the internal hole of the body 13 and provided with a half-moon port for use in supplying pressure oil to the hole of the cylinder block 51.

The pressure oil is supplied to and discharged from the hole of the cylinder block 51 via the valve plate 55 in the hydraulic motor 3. The piston 52 slidably fitted in the hole supplied with the pressure oil receives a component of force from the inclined plane of the inclined plate 53 and the component of force causes the cylinder block 51 to rotate together with the input rotary shaft 11. The hydraulic motor 3 is thus rotated by the pressure oil in one direction.

The hydraulic motor 3 has been employed as a driving motor and integrally provided in the reducer 5 according to this embodiment of the invention. However, the driving motor according to the invention may be any motor other than the hydraulic motor and need not be integral with the reducer as long as both are coupled together.

A freeing mechanism according to the invention will now be described in detail by reference to FIG. 2. A cylindrical body 61 is integrally fitted by a spline 11a and the like to the right-hand front end portion of the input rotary shaft 11 of the above-mentioned reducer as shown in FIG. 1. The spline 11a is formed up to the right-hand portion of the hollow hole of the cylindrical body 61, and a shaft member 63 is made movable axially while the shaft member 63 is coupled to the spline 11a as shown in FIGS. 2(a) and 2(b). Consequently, the shaft member 63 is not allowed to make any relative rotation but made axially movable in the front end portion of the input rotary shaft 11.

The spline is formed on the outer periphery of the shaft member 63 and forms a shaft-side spline 63a via a small-diameter portion 63b in its right-hand front end portion. Another shaft-side spline 63e is formed on a side opposite from the shaft-side spline 63a with respect to the small-diameter portion 63b. The axial length of this shaft-side spline 63a is set shorter than the moving length (axially movable length) of the shaft member 63.

A cylinder-side spline 41a is formed in a hollow hole of the base portion of the first external gear 41 and the shaft-side spline 63a of the shaft member 63 can be joined to the cylinder-side spline 41a by way of a spline joint. The axial length of the cylinder-side spline 41a is also set shorter than the moving length of the shaft member 63. A large-diameter hole portion 41b is formed in a manner adjacent to the cylinder-side spline 41a formed in the hollow hole of the base portion of the first external gear 41 (on the left-hand side of the cylinder-side spline in FIG. 1). When the shaft member 63 is moved to the left to position the shaft-side spline 63a in the large-diameter hole portion 41b, the cylinder-side spline 41a in the base portion of the first external gear 41 is released from engaging with the shaft-side spline 63a of the shaft member 63. In addition, another cylindrical-side spline 41c is provided in the hollow hole of the base portion of the first external gear 41 for engagement with and disengagement from the shaft-side spline 63e in accordance with the axial movement of the shaft member 63.

The shaft member 63 is kept urged to the right axially by a compression spring 65 mounted on the outer peripheral portion of the cylindrical member 61. The right-hand edge face of the compression spring 65 is kept in contact with the collar 63c integrally fitted to the shaft member 63. Further, a recessed portion 63d is formed in the right-hand front end portion of the shaft member 63 and contains a ball member 66 that is formed of a small-diameter ball and left freely rotatable. The front end of the ball member 66 is slightly projected outward from the right-hand front end of the shaft member 63. A pin member 67 with a collar 67a is kept in contact with the outer side of the right-hand edge face of the shaft member 63. The pin member 67 is fitted into the axial hole 47a of the cover member 47 provided on the right-hand edge face of the reducer, and a recessed member 68 for the cover is fitted to the cover member 47 by a bolt 69 on the right-side edge face of the pin member 67. A recessed portion coaxial with the axial hole 47a is formed to the left end (inner side wall) of the cover member 47, a ring-shaped bush 70 for a thrust bearing is held between the left-hand end of the cover member 47 and the right-hand end of the first external gear 41.

Figure 2A:
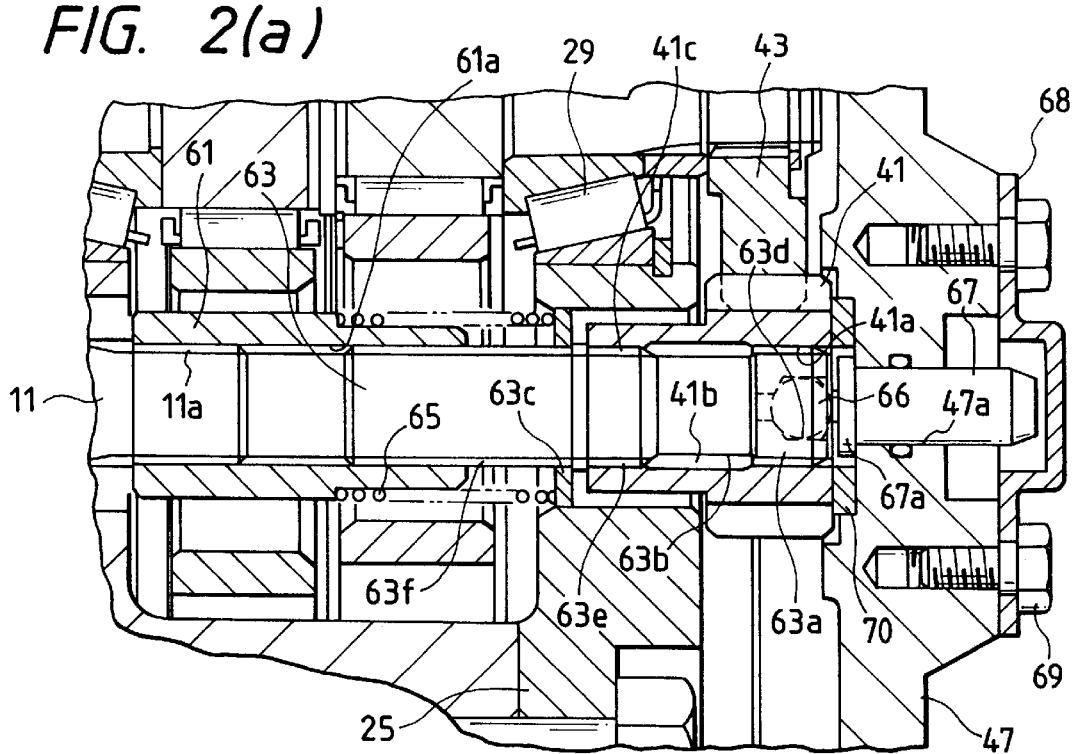
FIG. 2 is an enlarged view of a portion of FIG. 1 where an input rotary shaft is coupled to a first external gear: (a) refers to a state in which the input rotary shaft and the first external gear have been coupled together; and (b) to a free state in which the input rotary shaft has been released from being coupled to the first external gear.
Figure 2B:
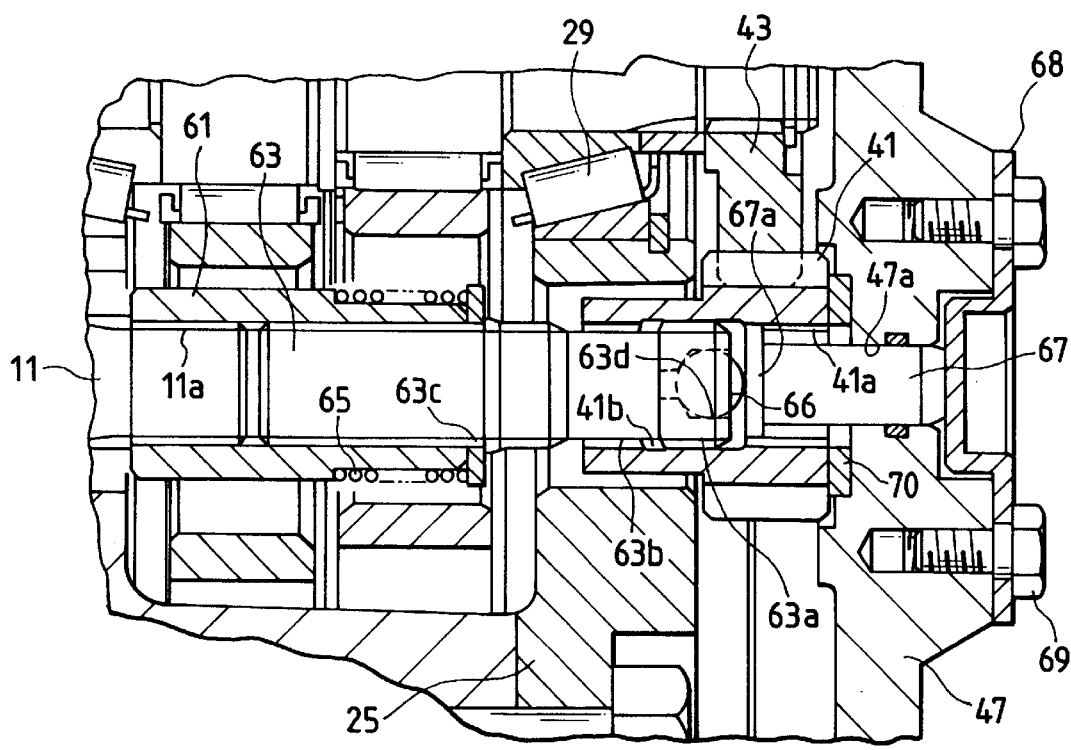

In the state of FIG. 2(a), the shaft member 63 is urged to the right by the compression spring 65, and the shaft member 63 is pressed by the urging force thereof to the right-hand position shown in FIG. 2(a), the first external gear 41 being brought into contact with the bush 70 for the thrust bearing. The ball member 66 formed at the front end of the shaft member 63 is set close to the pin member 67 so as to contact the pin member 67 or keep a very small gap therebetween. In this state, the shaft-side spline 63a of the shaft member 63 is joined to the cylinder-side spline 41a of the first external gear 41 by way of the spline joint, and the rotation of the input rotary shaft 11 is transferred to the first external gear 41 via the shaft member 63, which makes a regular operating condition.

In a case where it is needed to operate the reducer 5 by external force for some reason or other, on the other hand, the coupling of the driving motor 3 with the reducer 5 will have to be released. In this case, the bolt 69 used to fix the recessed member 68 to the cover member is removed first and the recessed member 68 is turned over as shown in FIG. 2(b) before being clamped to the cover member 47 with the bolt 69. Consequently, the pin member 67 is pressed to the left by the inwardly recessed outer surface of the recessed member 68, whereby the shaft member 63 is moved to the left via the ball member 66 having the small-diameter ball. With the shaft member 63 thus moved, the spline joint between the shaft-side spline 63a of the shaft member 63 and the cylinder-side spline 41a of the first external gear 41 is canceled and the input rotary shaft 11 is freed from the first external gear 41. When the shaft member 63 is moved axially, the leftward movement of the shaft member 63 is carried out without any interference because the spring member 65 is compressed.

Thus, the coupling of the reducer 5 to the driving motor 3 can simply be cut off according to the invention, whereby the reducer 5 can be operated without any interference of the driving motor 3 by operating the output side of the reducer 5 with relatively small force.

FIG. 3 shows external teeth 79 of the spline 63a of the shaft member 63. The external teeth 79 are axially extended and peripherally set at equal intervals. Tooth thickness t of a side end portion of each tooth 79, which is located axially adjacent to the internal tooth of the spline 41a when the external teeth 79 of the spline 63a is disengaged from the internal teeth of the spline 41a (that is, one end portion where engagement is started with respect to the internal tooth of the spline 41a) is gradually decreased toward the adjacent end of each tooth (one end in this case). Similarly, tooth height h in the side end portion of each tooth 79 is gradually decreased toward the adjacent end of each tooth. Consequently, it is possible to smooth the progress of the engagement between the external and internal teeth of the splines 61a and 41a when the shaft member 63 is moved from the freeing position toward the coupling position. In this embodiment, a similar tooth-thickness and tooth-height gradually reduced portion is also provided for each of external teeth of the spline 63e to facilitate the engagement between the spline 63e and the 41c. Further, a similar tooth-thickness and tooth-height gradually reduced portion may be provided for each of the internal teeth of the splines 41a and 41c.

As a result, the shaft member 63 is moved to one side by the urging force of the spring 65, thus causing the external teeth of the spline 63a to engage with the internal teeth of the spline 41a, and causing the external teeth of the spline 63e to engage with the internal teeth of the spline 41c. In this manner, the shaft member 63 is made to engage with the first external gear 41. when the external teeth of the splines 63a and 63e start engaging with the respective internal teeth of the spline 41a and 41c, the tooth-thickness and tooth-height gradually decreased portion provided for each tooth of the splines 63a and 63e facilitates the engagement between the external teeth of the splines 63a and 63e and internal teeth of the splines 41a and 41b.

Although the hydraulic motor 11 has been employed as a driving motor in the preceding embodiment of the invention, an electric motor may also be used according to the invention. Further, though the invention has been applied to driving of crawler vehicles in the preceding embodiment, the invention may also be applicable to crane winches.

The spline internal teeth 61a, 41a, and 41c have been formed on the cylindrical body 61 and the first external gear 41, whereas the spline external teeth 63a, 63e and 63f have been formed on the shaft member 63 in the preceding embodiment of the invention. However, spline external teeth may be formed on the cylindrical body 61 and/or the first external gear 41, whereas the spline internal teeth may also be formed on the shaft member 63 correspondingly. Further, the engagement/disengagement mechanism constructed by the splines 61a, 41a, etc. has been provided between the shaft member 63 and the first external gear 41 in the preceding embodiment. However, the engagement/disengagement mechanism may be provided between the cylindrical body 61 and the shaft member 63. As noted above, the tooth-thick and tooth-height gradually decreased portion may be provided on one of an external spline tooth side and a mating internal spline tooth side, or both of the external spline tooth side and the mating internal spline tooth side.

According to the invention, the motorized gear reducer is so adapted that when it is needed to operate the motorized gear reducer freely for some reason or other, the whole of the motorized gear reducer can easily be operated by releasing the gear reducer from being coupled to the motor and applying small force to the output side of the gear reducer. Further, the coupling of the reducer to the motor can be released simply and quickly according to the invention.

What is claimed is:

1. A freeing mechanism for a motorized gear reducer comprising:
    a driving motor;
    an input rotary shaft coupled to the driving motor;
    first and second external gears meshing with each other; and
    a movable shaft member selectively coupling the first external gear to the input rotary shaft, wherein the movable shaft member is axially movable between first and second positions relative to the input rotary shaft and the first external gear so that the movable shaft in the first position is engaged with both the input rotary shaft and the first external gear to establish an integral rotation condition, and the movable shaft in the second position is engaged with one of the input rotary shaft and the first external gear but disengaged from the other of the input rotary shaft and the first external gear to establish a free rotation condition, the movable shaft member has first and second splines, and a first non-engaging portion adjacent the second spline, said one of the input rotary shaft and the first external gear has a third spline constantly engaged with the first spline regardless of whether the movable shaft member is in the first position or the second position, and said the other of the-input rotary shaft and the first external gear has a fourth spline and a second non-engagement portion adjacent the fourth spline, the second non-engagement portion being longer than the second spline of the movable member, wherein the second spline of the movable shaft member in the first position is engaged with the fourth spline, and the second spline of the movable member in the second position is disengaged from the fourth spline and supported by the second non-engagement portion.

2. A freeing mechanism for a motorized gear reducer as claimed in claim 1, wherein one of the first and third splines is in the form of internal teeth, and the other of the first and third splines is in the form of external teeth.

3. A freeing mechanism for a motorized gear reducer as claimed in claim 1, wherein one of the second and fourth splines is in the form of internal teeth, and the other of the second and fourth splines is in the form of external teeth.

4. A freeing mechanism for a motorized gear reducer as claimed in claim 1, wherein one of the first and second non-engagement portions is in the form of a smaller outer diameter portion, and the other of the first and second non-engagement portions is in the form of a larger inner diameter portion.

5. A freeing mechanism for a motorized gear reducer as claimed in claim 1, wherein at least one of the second and fourth splines has a tooth-thickness and/or tooth-height reduced portion for facilitating engagement between the second and fourth splines when the movable shaft member is moved from the second position to the first position.

6. A freeing mechanism for a motorized gear reducer as claimed in claim 1, further comprising:
a cover and a pin that is coaxial with the movable shaft member and are axially-movably supported to move the movable shaft member between the first and second positions.

7. A freeing mechanism for a motorized gear reducer as claimed in claim 6, wherein the input rotary shaft, the movable shaft member and the first external gear are arranged coaxially with one another.

8. A freeing mechanism for a motorized speed reducer as claimed in claim 6, further comprising:
a spring urging the movable shaft member toward the first position.

9. A freeing mechanism for a motorized gear reducer as claimed in claim 1, further comprising:
a cover;
a recessed member attached to the cover, the recessed member defining a recess on a first side thereof and a protrusion on a second opposite side;
a pin supported by the cover, wherein:
the first external gear has a hollow cylindrical portion axially movably receiving the movable shaft member, when the recessed member is attached to the cover so that the first side contacts the cover, the pin is partially accommodated within the recess to permit the movable shaft member to move to the first position, and
when the recessed member is attached to the cover so that the second side contacts the cover, the pin is pushed by the protrusion to partially protrude into the hollow cylindrical portion, thereby moving and holding the movable shaft member at the second position.

10. A freeing mechanism for a motorized gear reducer comprising:
a driving motor;
an input rotary shaft coupled to the driving motor;
first and second external gears meshing with each other; and
a movable shaft member selectively coupling the first external gear to the input rotary shaft, wherein the movable shaft member is axially movable between first and second positions relative to the input rotary shaft and the first external gear so that the movable shaft in the first position is engaged with both the input rotary shaft and the first external gear to establish an integral rotation condition, and the movable shaft in the second position is engaged with one of the input rotary shaft and the first external gear but disengaged from the other of the input rotary shaft and the first external gear to establish a free rotation condition, the movable shaft member has first and second splines, and a first non-engaging portion adjacent the second spline, said one of the input rotary shaft and the first external gear has a third spline constantly engaged with the first spline regardless of whether the movable shaft member is in the first position or the second position, and said the other of the input rotary shaft and the first external gear has a fourth spline and a second non-engagement portion adjacent the fourth spline, wherein the second spline of the movable shaft member in the first position is engaged with the fourth spline, and the second spline of the movable member in the second position is disengaged from the fourth spline and confronted with the second non-engagement portion, wherein the movable shaft member has a fifth spline adjacent the first non-engagement portion and opposite from the second spline, and said the other of the input rotary shaft and the first external gear has a sixth spline adjacent the second non-engagement portion and opposite from the fourth spline, wherein the second and fifth splines of the movable shaft member in the first position are respectively engaged with the fourth and the sixth splines, and the second and fifth splines of the movable shaft member in the second position are respectively disengaged from the fourth and the sixth splines so that the second spline is confronted with the second non-engagement portion and the sixth spline is confronted with the first non-engagement portion.

11. A freeing mechanism for a motorized gear reducer as claimed in claim 10, wherein one of the fifth and sixth splines is in the form of internal teeth and the other of the fifth and sixth splines is in the form of the external teeth.

12. A freeing mechanism for a motorized gear reducer as claimed in claim 10, wherein at least one of the fifth and sixth splines has a tooth-thickness and/or tooth-height reduced portion for facilitating engagement between the fifth and sixth splines when the movable shaft member is moved from the second position to the first position.

13. A freeing mechanism for a motorized gear reducer, comprising:
a drive motor;
an input rotary shaft coupled to the driving motor;
a first external gear mounted on the input rotary shaft; and
a second external gear meshing with the first external gear, wherein a front end portion of said input rotary shaft on a first external gear side is unable to make a relative rotation with respect to said input rotary shaft but is movable in the axial direction of said input rotary shaft; said front end portion thereof movably axially engages with said first external gear; and said front end portion thereof and said first external gear are allowed to select one of the conditions including making an integral rotation and freely making relative rotations in accordance with the axial movement of said front end portion thereof, wherein said front end portion of said input rotary shaft on the first external gear side includes:

a cylindrical member which is integrally mounted to a front end portion of a body of said input rotary shaft and has a spline groove at the front end of said first external gear side, and a shaft member which axially movably joined to said cylindrical member by way of a spline joint; said shaft member axially has a shaft-side spline having a predetermined length at the front end on said first external gear side, wherein:

a base side of said first external gear is cylindrical to form a hollow portion; and the hollow portion has a cylinder-side spline engaging with said shaft-side spline formed for said shaft member by way of spline engagement, and a large-diameter hole portion not engaging with said shaft-side spline, the large-diameter hole portion being longer than the shaft-side spline, such that the shaft-side spline, when disengaged from the cylinder-side spline, is supported by the large-diameter hole portion.

14. A freeing mechanism for a motorized gear reducer as claimed in claim 13, wherein said front end portion on said input rotary shaft side has a spring member for engaging said shaft-side spline with said cylinder-side spline by way of spline engagement by normally urging said shaft member toward said first external gear side.

15. A freeing mechanism for a motorized gear reducer as claimed in claim 14, wherein said reducer includes a cover member located outside said first input rotary shaft, a pin member engaging with the axial front end of the shaft member of said input rotary shaft and a recessed member engaging with the outer-side front end of said pin member and wherein said shaft-side spline and said cylinder-side spline are allowed to select one of the spline engagement and free conditions depending on the direction of mounting said recessed member.

16. A freeing mechanism for a motorized gear reducer as claimed in claim 15, wherein a ball of a predetermined diameter is provided between the axial front end of said shaft member of said input rotary shaft and said pin member.

17. A freeing mechanism for a motorized gear reducer as claimed in claim 13, further comprising:

a cover and a pin that is coaxial with the front end portion and are axially-movably supported to move the front end portion between the first and second positions.

18. A freeing mechanism for a motorized gear reducer as claimed in claim 17, wherein said motorized gear reducer is a planetary differential gear reducer and wherein said second external gear is coupled to a crank pin of said planetary differential gear reducer.

* * * * *